Jan. 7, 1958  M. B. SMITH  2,819,385
ILLUMINATION DEVICE
Filed Jan. 20, 1955  2 Sheets-Sheet 2
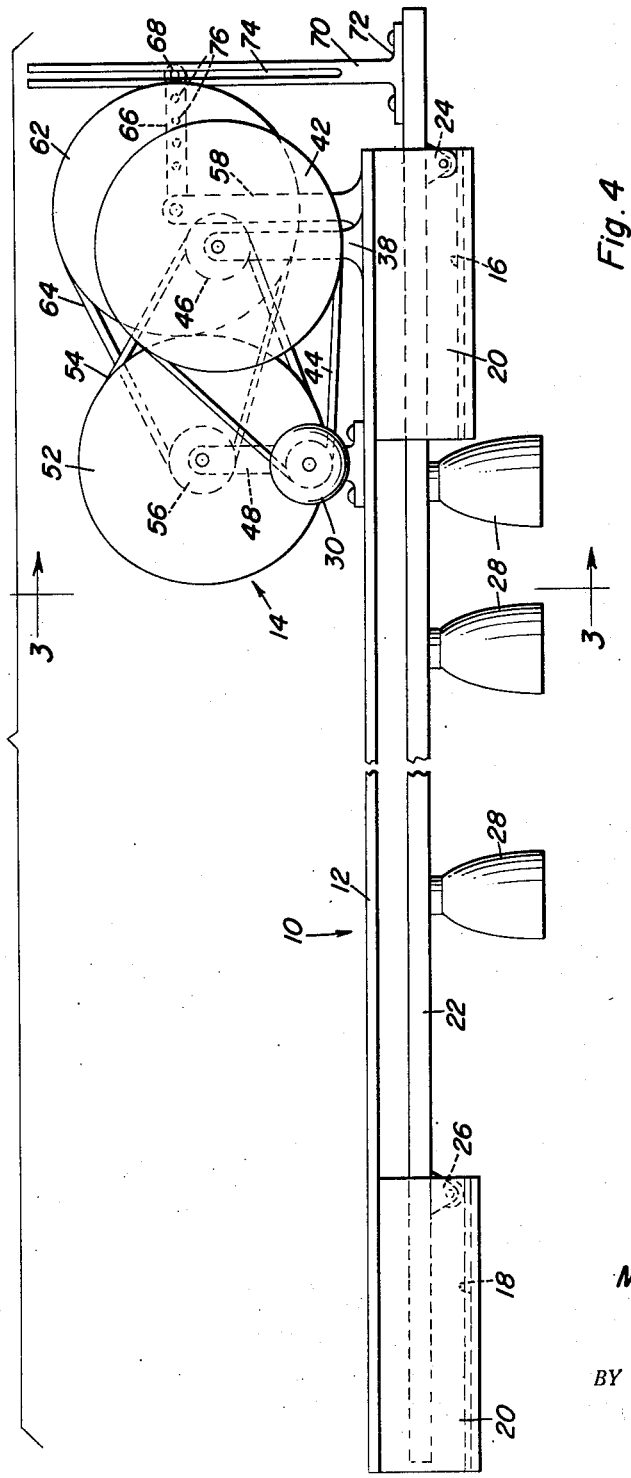
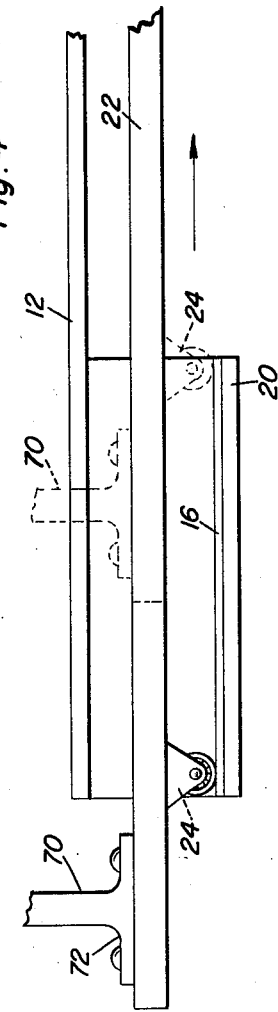
Melvin B. Smith
INVENTOR.

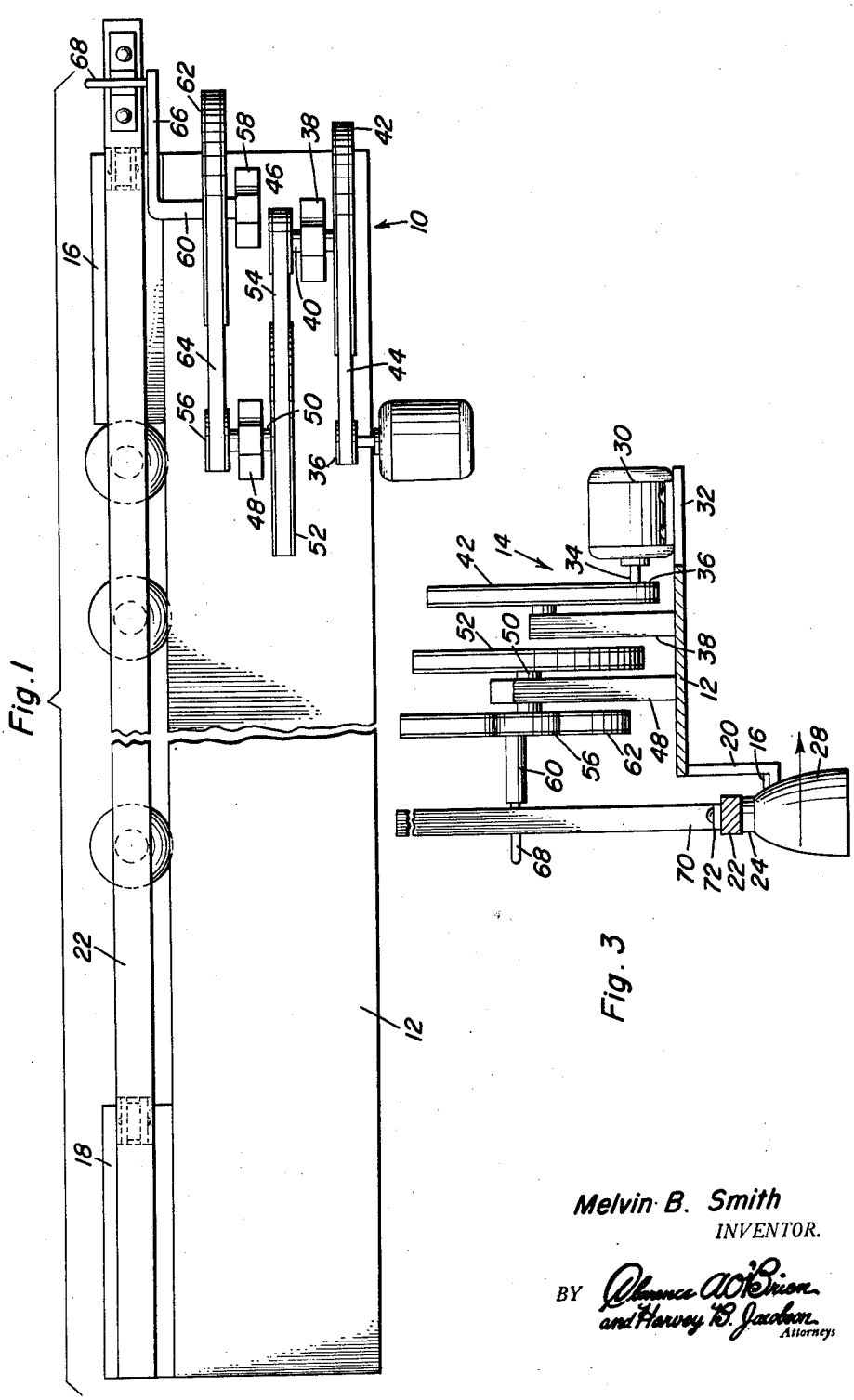

United States Patent Office 2,819,385
Patented Jan. 7, 1958

2,819,385

ILLUMINATION DEVICE

Melvin B. Smith, Pauls Valley, Okla.

Application January 20, 1955, Serial No. 483,035

5 Claims. (Cl. 240—6)

This invention relates in general to new and useful improvements in illuminating devices, and more specifically to an improved illuminating device for use in illuminating light reflector displays.

For many years it has been the custom of merchants to display their articles which are for sale in their show windows. Such a practice often results in sales not otherwise made due to the fact that shoppers passing by the show windows see articles which strike their attention and as a result they buy them. A jeweler and other merchants of fine articles, including diamonds and other stones, are no exceptions. In fact, many special types of displays have been made by jewelers so as to call particular attention to shoppers of certain articles of jewelry.

It is therefore the primary object of this invention to provide an improved illuminating device which may be utilized in combination with jewelry displays for varying the light distributed to such jewelry whereby the light reflecting from the jewelry in the display window will vary and thereby quickly call to the attention of passing shoppers the jewelry in the display case or window.

Another object of this invention is to provide an improved illuminating device for display cases, the illuminating device being of such a nature whereby the light directed upon articles being displayed will be automatically and continuously varied in order that the light reflecting off of such articles will continuously vary.

Still another object of this invention is to provide an improved illuminating device for displays, the illuminating device being so constructed whereby light sources thereof will be continuously reciprocated or otherwise moved with respect to a display so that the display will sparkle or radiate light in an entirely different manner from that of a fixed light source.

A further object of this invention is to provide an improved illuminating device for displays which will vary the light directed upon articles being displayed, the illuminating device being so constructed whereby it may be conveniently mounted in existing display windows out of sight of the shoppers with a minimum of alterations to the display windows.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the illuminating device which is the subject of this invention and shows the general details of the relationship between the drive means for the illuminating device and the light sources which are reciprocated by the drive means;

Figure 2 is a front elevational view of the illuminating device of Figure 1 and shows further the details of the relationship between the drive means for the illuminating device and the light sources thereof;

Figure 3 is a transverse vertical sectional view taken substantially upon the plane indicated by the section line 3—3 of Figure 2 and shows the off-set relationship of the means for supporting the light sources with respect to the drive means for reciprocating the light sources; and Figure 4 is a rotative fragmentary elevational view of the varying end of the illuminating device, as viewed in Figure 2, with the drive means omitted for purposes of clarity and clearly shows the manner in which a support for the light sources is mounted on a supporting track, the shifted position of the support for the light sources being shown in dotted lines.

Referring now to the drawings in detail, it will be seen that there is illustrated the illuminating device, which is the subject of this invention, the illuminating device being referred to in general by the reference numeral 10. The illuminating device 10 includes a supporting frame 12 which is relatively elongated. The supporting frame 12 has mounted thereon a drive unit which is referred to in general by the reference numeral 14 and which will be described in more detail hereinafter.

Carried by the supporting frame 12 at one edge thereof and adjacent the opposite ends thereof is a pair of spaced tracks 16 and 18. The tracks 16 and 18 are supported by elongated L-shaped cross sectional supports 20 which are secured to the supporting frame 12 at the one edge thereof, as is best illustrated in Figure 3.

Extending between the tracks 16 and 18 and disposed in overlying relation with respect thereto is an elongated supporting member 22. The supporting member 22, as is best illustrated in Figure 2, is provided adjacent the right-hand end thereof with a wheel assembly 24 and adjacent the left-hand end thereof, but further spaced from that end, with a wheel assembly 26. The wheel assemblies 24 and 26 are engaged with the tracks 16 and 18, respectively, and are spaced with respect to each other so that the wheel assemblies have the same relationship with respect to their respective tracks. Carried by the supporting member 22 and depending from the underside thereof is a plurality of light sources 28. The light sources 28 are spaced longitudinally of the support member 22 and are preferably in the form of spotlights. It is to be understood that they are to be wired in any suitable manner for selective illumination.

As is best illustrated in Figures 1, 2 and 3, the drive unit 14 includes an electric motor 30 which is mounted on an extension 32 of the supporting frame 12. The electric motor 30 includes an armature shaft 34 carrying a drive pulley 36.

Extending upwardly from the support frame 12, as is best illustrated in Figure 1, is a shaft support 38 which has extending therethrough a shaft 40 mounted for rotation. Carried by one end of the shaft 40 in alignment with the drive pulley 36 is a relatively large pulley 42. Entrained over the pulleys 36 and 42 is a drive belt 44. Carried by the opposite end of the shaft 40 is a relatively small pulley 46.

Also projecting upwardly from the supporting frame 12, but in generally spaced parallel relation with respect to the drive pulley 36 and in alignment therewith is a shaft support 48. The shaft support 48 has extending therethrough and supported thereby for rotation a shaft 50. One end of the shaft 50 is provided with a relatively large pulley 52 which is aligned with the pulley 46. Entrained over the pulleys 46 and 52 is a drive belt 54. The opposite end of the shaft 48 is provided with a relatively small pulley 56.

Further extending upwardly from the supporting frame 12 in longitudinal alignment with the shaft support 48 is a shaft support 58. The shaft support 58 has extending outwardly from one side thereof for rotation a shaft 60, Carried by the shaft 60 in alignment with the pulley 56 is a relatively large pulley 62. Entrained over the pulleys 56 and 62 is a drive belt 64.

In order that reciprocatory movement may be imparted to the supporting member 22, there is secured to the outer end of the shaft 60 a radially extending crank arm 66. The crank arm 66 carries a crank pin 68 which is off-set relative to the shaft 60 and which overlies the right-hand end of the supporting member 22, as viewed in Figure 2.

Secured to the right-hand end of the supporting member 22 and projecting upwardly therefrom is an upright 70. The upright 70 has a base 72 which facilitates thereof to the supporting member 22. The upright 70 is bifurcated substantially the full length thereof to provide a vertical slot 74 in which the crank pin 68 is positioned. Thus when the shaft 60 is rotated to effect rotation of the crank arm 66, the crank pin 68 will move up and down in the slot 74 and at the same time reciprocate the upright 70 and the support member 22 longitudinally of the support member 22.

It is pointed out at this time that the crank arm 66 is provided with a plurality of apertures 76 in which the crank pin 68 may be selectively positioned so as to vary the effective stroke of the supporting member 22. It is also pointed out that the wheels or rollers of the wheel assemblies 24 and 26 are cushioned, as well as are the tracks 16 and 18 so that the operation of the illuminating device 10 is substantially noiseless.

It is to be understood that the illuminating device 10 is to be placed in the upper part of a display case, particularly that of a jeweler, with the entire illuminating device preferably out of the view of passersby. Inasmuch as the display case or window is to have diamonds and other precious stones displayed therein which will greatly reflect light, it will be readily apparent that as the light sources 28 are reciprocated, to vary the position of the light sources, then the rays reflecting from the diamonds and other jewelry, will appear to dance and create an additional spark or fire in the diamonds and other jewelry. This will make the display much more attractive and call attention to the displays. Inasmuch as once a prospective buyer's attention is caught, it is much easier to sell the device, it will be readily apparent that the illuminating device will greatly increase the sales of articles illuminated thereby.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. An illuminating device for displays comprising a supporting frame, spaced generally aligned track sections mounted adjacent said frame, a supporting member extending between and supported by said track sections for reciprocation, continuously operating drive means carried by said frame connected to said member for imparting continuous reciprocatory movement thereto, and a plurality of light sources carried by said member and directed away from said member, said member being provided with wheel assemblies adjacent opposite ends thereof, said wheel assemblies being engaged with said track sections, said track sections being provided with cushioned wheel engaging surfaces, whereby reciprocation of said member is substantially noiseless.

2. An illuminating device for displays comprising a supporting frame, spaced generally aligned track sections mounted adjacent said frame, a supporting member extending between and supported by said track sections for reciprocation, continuously operating drive means carried by said frame connected to said member for imparting continuous reciprocatory movement thereto, and a plurality of light sources carried by said member and directed away from said member, said drive means including a rotatable crank arm, a crank pin carried by said crank arm, an upright carried by said member, said upright being vertically slotted, said crank pin being received in said upright.

3. An illuminating device for displays comprising a supporting frame, spaced generally aligned track sections mounted adjacent said frame, a supporting member extending between and supported by said track sections for reciprocation, continuously operating drive means carried by said frame connected to said member for imparting continuous reciprocatory movement thereto, and a plurality of light sources carried by said member and directed away from said member, said drive means including a rotatable crank arm, a crank pin carried by said crank arm, an upright carried by said member, said upright being vertically slotted, said crank pin being received in said upright, said crank pin being adjustably carried by said crank arm to vary the stroke of said member.

4. In combination with a display case having light reflective displays positioned therein, an illuminating device for displays comprising a supporting frame, spaced generally aligned track sections mounted adjacent said frame, a supporting member extending between and supported by said track sections for reciprocation, continuously operated drive means carried by said frame connected to said member for imparting continuous reciprocatory movement thereto, and a plurality of light sources carried by said member and directed away from said member, said member being provided with wheel assemblies adjacent opposite ends thereof, said wheel assemblies being engaged with said track sections, said track sections being provided with cushioned wheel engaging surfaces, whereby reciprocation of said member is substantially noiseless, said light sources being directed towards said displays.

5. An illuminating device for displays comprising an elongated supporting frame, spaced aligned track sections carried by said supporting frame along one edge thereof, said track sections being disposed adjacent opposite ends of said supporting frame, a supporting member extending between and having end portions overlying said track sections, wheel means on opposite ends of said supporting member continuously engaging said track sections and mounting said supporting member for limited reciprocatory movement, continuously operated drive means mounted on said supporting frame and connected to said supporting member for imparting continuous reciprocatory movement to said supporting member, and a plurality of light units carried by said supporting member and directed away from said supporting member, said drive means including a power unit, reduction gearing connected to said power unit, a rotatable crank arm, a crank pin carried by said crank arm, and an upright carried by said supporting member, said upright having a vertically disposed slot, said crank pin being disposed in said slot and engaging said crank pin whereby when said crank arm is rotated, said crank pin simultaneously reciprocates in said slot and reciprocates said upright and said supporting member.

References Cited in the file of this patent

UNITED STATES PATENTS

| 1,154,934 | Pilling et al. | Sept. 28, 1915 |
| 2,094,659 | Levin | Oct. 5, 1937 |
| 2,136,429 | Forsyth | Nov. 15, 1938 |
| 2,243,788 | Benard | May 27, 1941 |
| 2,609,484 | Benard | Sept. 2, 1952 |

FOREIGN PATENTS

| 279,161 | Great Britain | Oct. 20, 1927 |